United States Patent [19]
Fleischer, III et al.

[11] Patent Number: 5,680,446
[45] Date of Patent: Oct. 21, 1997

[54] ADVANCED INTELLIGENT NETWORK SCREENING

[75] Inventors: Harold C. Fleischer, III; Michael W. Boeckman, both of St. Louis, Mo.

[73] Assignee: Southwestern Bell Technology Resources, Inc., Austin, Tex.

[21] Appl. No.: 518,999

[22] Filed: Aug. 24, 1995

[51] Int. Cl.⁶ .......................... H04M 15/00; H04M 3/00; H04M 7/00
[52] U.S. Cl. .......................... 379/114; 379/112; 379/113; 379/115; 379/196; 379/197; 379/229; 379/230
[58] Field of Search .................................. 379/111, 112, 379/113, 114, 115, 188, 189, 196, 197, 201, 207, 229, 230

[56] References Cited

U.S. PATENT DOCUMENTS

| | | | |
|---|---|---|---|
| 4,191,860 | 3/1980 | Weber | 379/116 |
| 4,313,035 | 1/1982 | Jordan et al. | 379/207 |
| 4,611,094 | 9/1986 | Asmuth et al. | 379/113 |
| 4,611,096 | 9/1986 | Asmuth et al. | 379/115 |
| 4,756,020 | 7/1988 | Fodale | 379/113 |
| 4,757,267 | 7/1988 | Riskin | 379/113 |
| 4,788,718 | 11/1988 | McNabb et al. | 379/112 |
| 4,802,199 | 1/1989 | Lange et al. | 379/221 |
| 4,899,373 | 2/1990 | Lee et al. | 329/111 |
| 5,247,571 | 9/1993 | Kay et al. | 379/112 |
| 5,315,641 | 5/1994 | Mongomery et al. | 379/94 |
| 5,353,331 | 10/1994 | Emery et al. | 379/58 |
| 5,418,844 | 5/1995 | Morrisey | 379/112 |
| 5,422,941 | 6/1995 | Hasenauer | 379/112 |
| 5,436,957 | 7/1995 | McConnell | 379/230 |
| 5,455,855 | 10/1995 | Hokeri | 379/196 |
| 5,467,388 | 11/1995 | Redd | 379/207 |
| 5,469,500 | 11/1995 | Satter et al. | 379/201 |
| 5,479,495 | 12/1995 | Blumhardt | 379/207 |

OTHER PUBLICATIONS

Berman, Roger K., and Brewster, John H., "Perspectives on the AIN Architecture," IEEE Communications Magazine, Feb. 1992, pp. 27–32.

"Status of PINs and Remote Access," Bell Communications Research, Technical Memorandum TM–INS–021336, May 29, 1992.

"Class Calling Name Delivery Generic Requirements FSD 01–02–1070," LATA Switching Systems Generic Requirements, Bell Communications Research, Technical Reference TR–NWT–001188, Issue 1 (Dec. 1991).

"Switching System Requirements for Call Control Using the Integrated Services Digital Network User Part (ISDNUP)," Bell Communications Research, Technical Reference TR–TSY–000317, Issue 2 (Jan. 1989).

"Class Feature: Selective Call Acceptance," Bell Communications Research, Technical Advisory TA–TSY–001034, Issue 1 (Apr. 1990).

"Class Feature: Distinctive Ringing/Call Waiting," Bell Communications Research, Technical reference TR–TSY–000219, Issue 2 (Aug. 1988).

"Class Feature: Calling No. Delivery FSD–01–02–1051," Bell Communications Research, Technical Reference TR–TSY–000031, Issue 3 (Jan. 1990).

"ISDN Call Forwarding," Bell Communications Research, Technical Reference TR–TSY–000853, Issue 1 (Dec. 1988).

(List continued on next page.)

Primary Examiner—Curtis Kuntz
Assistant Examiner—Vijay Shankar
Attorney, Agent, or Firm—Greenblum & Bernstein P.L.C.

[57] ABSTRACT

An network screening application is provided for use in an Advanced Intelligent Network (AIN). The network screening application may provide two screening features for a private telecommunications network. One screening feature may screen off-network calls to be terminated on the private network to ensure that the calling party is an authorized user of the network and to ensure that the called party is authorized to receive the off-network calls. The other screening feature may screen outgoing calls from the private network (i.e., on-network calls) such as long distance phone calls terminating outside of the local service area of the network, to ensure that the on-network calling party is authorized to make outgoing calls from the network.

32 Claims, 9 Drawing Sheets

OTHER PUBLICATIONS

"ISDN Call Forwarding, Revision 1," Bell Communications Research, Technical Reference TR–TSY–000853, Revision 1 (Dec. 1993).

"Generic Requirements for ISDN Automatic Recall," Bell Communications Research, Technical Reference TR–NWT–001199, Issue 1 (Feb. 1992).

"Class Feature: Automatic Recall FSD 01–02–1260,"Bell Communications Research, Technical Reference TR–NWT–000227, Issue 3 (Jun. 1993).

"Class Feature: Automatic Callback FSD 01–02–1250" Bell Communications Research, Technical Reference TR–NWT–000215, Issue 3 (Jun.1993).

"Class Feature: Automatic Callback–Bulletin 1," Bell Communications Research (Apr. 1995).

| PRIVATE NETWORK TELEPHONE NUMBER | ORIGINATION/TERMINATION SCREENING CODE |
|---|---|
| 1. 214-320-7231 | 10 |
| 2. 214-321-7231 | 20 |
| 3. 214-330-1111 | 30 |
| 4. 214-330-7231 | 30 |
| 5. 214-390-0000 | 13 |
| 6. 214-390-1111 | 13 |
| 7. 214-390-2222 | 23 |
| 8. 214-390-3333 | 33 |
| 9. 214-390-4000 | 40 |
| 10. 214-390-4444 | 33 |

FIG. 4

| | PBX TELEPHONE NUMBER | PBX OFFICE ROUTING NUMBER (ROUTE INDEX) |
|---|---|---|
| 1. | 214-390 | 01562000 |
| 2. | 214-390-1 | 01562000 |
| 3. | 214-390-022 | 01572000 |
| 4. | 214-390-0333 | 01582000 |
| 5. | 214-390-4444 | 01582000 |

FIG. 6

| NPA-NXX | SSP 12 ROUTE INDEX | SSP 14 ROUTE INDEX | SSP 18 ROUTE INDEX |
|---|---|---|---|
| 1. 214 | 00000155 | | 01502000 |
| 2. 214 320 | 00000154 | | 01512000 |
| 3. 214 330 | | | 01592000 |
| 4. 214 390 | 00000155 | | |
| 5. 512 | 00000157 | | 01522000 |
| 6. 512 340 | 00000156 | | 01532000 |
| 7. 512 380 | 00000158 | | |
| 8. 512 390 | | | 01522000 |
| 9. 817 | 00000162 | | 01522000 |
| 10. 915 | 00000155 | | 01602000 |

FIG. 7

| | SCREENING CODE | SSP 12 ROUTE INDEX | SSP 14 ROUTE INDEX | SSP 18 ROUTE INDEX |
|---|---|---|---|---|
| 1. | 11 | 00001122 | 00002211 | 01532000 |
| 2. | 12 | 00001154 | 00002233 | 00003322 |
| 3. | 13 | 00001144 | 00002244 | 00003344 |
| 4. | 14 | 00001155 | 00002255 | 00003355 |
| 5. | 15 | 00001166 | 00002266 | 00003366 |
| 6. | 16 | 00001177 | 00002277 | 00003377 |
| 7. | 17 | 00001188 | 00002288 | 00003388 |
| 8. | 18 | | | |

FIG. 8

ADVANCED INTELLIGENT NETWORK SCREENING

BACKGROUND OF THE INVENTION

1. Field of the Invention

The present invention generally relates to an apparatus and method for screening calls in a telecommunications network. More particularly, the present invention relates to an application in an Advanced Intelligent Network (AIN) for providing controlled access to calls originating and terminating on a private telecommunications network.

2. Acronyms

The written description provided herein contains acronyms which refer to various communication services and system components. Although known, use of several of these acronyms is not strictly standardized in the art. For purposes of the written description herein, acronyms will be defined as follows:

AIN—Advanced Intelligent Network
CCIS—Common Channel Interoffice Signaling
CENTREX—Central Exchange Service
CO—Central Office
CPR—Call Processing Record
DID—Direct Inward Dialing
DRS—Data Reporting System
ISCP—Integrated Service Control Point
IXC—Interexchange Carrier
LATA—Local Access and Transport Area
NPA—Number Plan Area, i.e., area code
NXX—Central Office Code
PBX—Private Branch Exchange
PIC—Primary Interexchange Carrier
SCP—Service Control Point
SMDR—Station Message Detail Recording
SS7—Signaling System 7
SSP—Service Switching Point
STP—Signaling Transfer Point
TCAP—Transaction Capabilities Applications Protocol
TCP/IP—Transmission Control Protocol/Internet Protocol
WAN—Wide Area Network

3. Background and Material Information

In recent years, a number of new telephone service features have been provided by an Advanced Intelligent Network (AIN). The AIN evolved out of a need to increase the capabilities of the telephone network architecture to meet the growing needs of telephone customers. The AIN architecture generally comprises two networks, a data messaging network and a trunked communications network. The trunked communications network handles voice and data communications between dispersed network locations, whereas the data messaging network is provided for controlling operations of the trunked communications network.

An illustration of the basic components of an AIN architecture is shown in FIG. 5. As shown in FIG. 5, Central Offices (CO) 64–70 are provided for sending and receiving data messages from an Integrated Service Control Point (ISCP) 56 via a Signaling Transfer Point (STP) 58–62. The data messages are communicated to and from the COs 64–70 and the ISCP 56 along a Common Channel Inter-Office Signaling (CCIS) network 88. Each CO 64–70 serves as a network Service Switching Point (SSP) to route telephone calls between a calling station (e.g., station 72) and a called station (e.g., station 84) through the trunked communications network 90–92. For more information regarding AIN, see Berman, Roger K., and Brewster, John H., "Perspectives on the AIN Architecture," IEEE Communications Magazine, February 1992, pp. 27–32, the disclosure of which is expressly incorporated herein by reference in its entirety.

A number of features provided by the prior AIN or AIN-type intelligent networks relate to specialized call processing of incoming calls.

For example, U.S. Pat. No. 4,191,860, to WEBER, provides for special processing of calls, such as INward WATS (Wide Area Telephone Service) calls, via a number of local switching offices based on information stored in a central database. The central database is located at a remote Service Control Point (SCP). The local and toll offices of the telephone network compile a call data message via a CCIS link to the central database. The database at the SCP translates the dialed INWATS number into an unlisted destination telephone number based on an originating area code. The unlisted destination number is returned to the central offices via the CCIS link, and the call is completed. When the number of telephone calls to the unlisted number per unit time exceeds a threshold, the database instructs the telephone system to inhibit such calls from being connected for a predetermined period of time.

U.S. Pat. Nos. 4,611,094 and 4,611,096, both to ASMUTH et al., disclose a system for providing custom incoming telephone call processing services to a subscriber operating at many geographically diverse locations. A subscriber program stored in a central database is accessed to provide instructions to the SSPs to complete incoming calls to one of the subscriber locations in accordance with special services defined by the subscriber. The subscriber program controls the Action Control Points (ACP) to string together the desired call processing capabilities to process each call. Specified parameters stored in the program, such as time of day, caller location and data inputted by the caller, determine the final destination to which each call should be completed.

U.S. Pat. No. 4,788,718, to McNABB, teaches centralized recording of call traffic information. The system provides a data gathering and recording function to the centralized database which stores the subscriber's call routing program. The subscriber's call routing program performs several functions, including presenting various announcements to callers, prompting callers for inputting information digits and collecting the resulting information digits, routing the call to a number provided by the subscriber, and performing final call dispositions other than routing to the telephone number provided by the subscriber. Processing of the call traffic information dynamically changes the subscriber's call routing program to reduce the number of blocked calls to the subscriber's telephone numbers.

U.S. Pat. No. 4,757,267, to RISKIN, discloses routing of an "800-type" telephone call. The system identifies the caller's originating telephone number and initially routes the call to an office in the general vicinity of the caller. The office includes a vertical-horizontal (V-H) file listing dealers by product/service and equivalent latitude and longitude. The call is routed to the nearest dealer for the identified product or service based on a comparison of the called 800-number and the data in the V-H file. If the call cannot be completed to the nearest dealer, because the dealer's telephone is busy or the dealer does not answer, the call is routed to the next nearest dealer.

U.S. Pat. No. 5,247,571, to KAY et al., discloses an Area Wide Centrex system to provide specialized calling features to stations connected to a plurality of central offices. Each of the central office switching points connects to a number of local telephone lines. The features are extended to the local telephone lines by taking the programming intelligence out of the central offices and moving it to a database located at a centralized location, such as an SCP. Service features are controlled by the central database and are changed by reprogramming the service logic located at the central database. A variety of service features are provided including a work at home service that enables a user of a private network access from a home telephone and access authorization to increase the security of the private network.

While prior AIN or AIN-type intelligent network applications have provided various call screening features to subscribers and users, these attempts do not control access to and from a private network system through AIN authority validation, as provided by the present invention. For example, while KAY et al. '571 discloses an access authorization service feature for an Area Wide Centrex, the system disclosed therein does not monitor whether an off-network originating caller is authorized to access the private network and determine if the on-network party offered termination is authorized to receive the call. Further, past attempts fail to monitor long distance calling traffic originating on-network to determine whether the authority to originate the call is unrestricted, restricted, or unauthorized.

Such features would be highly desirable to subscribers and users of private communication networks, such as large businesses and government agencies, that desire to restrict access to and maintain security of the network. In addition, such features, as provided by the present invention, are a useful solution for minimizing switch based screening exhaust.

OBJECTS OF THE PRESENT INVENTION

In view of the above, the present invention, through one or more of its various aspects and/or embodiments is thus presented to accomplish one or more objectives and advantages, such as those noted below.

A general objective of the present invention is to provide a flexible call screening application for use in an Advance Intelligent Network (AIN).

Another objective of the present invention is to provide Advanced Intelligent Network (AIN) functionality to a private network telephone system.

A further objective of the present invention is to provide Advanced Intelligent Network (AIN) functionality to a specialized service telephone number.

Still another objective of the present invention is to provide limited and controlled access to calls terminating on a private network telephone system.

Another objective of the present invention is to provide limited acceptance to calls terminating on a private network telephone system.

It is a further objective of the present invention to provide a limited access to calls originating on-network to off-network terminating members.

Yet another objective of the present invention is to route calls along and through a private telecommunications network.

It is another objective of the present invention to route calls along an interexchange carrier trunk.

A further objective of the present invention is to route calls along a 700-RXX line.

Another objective of the present invention is to provide a data record of calls terminating on-network, including the originating number, the terminating number and the time and date of the call.

It is yet a further objective of the present invention to provide a data record of calls originating on-network and terminating off-network, including the originating number, the terminating number and the time and date of the call.

A further objective of the present invention is to store a plurality of authorization codes to control access to numbers terminating on a private telecommunications network.

It is another objective of the present invention to store a plurality of authorization codes to control access to call originating on a private telecommunications network.

Yet another objective of the present invention is to store a plurality of screening tables to control access to numbers terminating on a private telecommunications network.

SUMMARY OF THE PRESENT INVENTION

According to one aspect of the present invention, a method is provided for screening calls associated with a private network in an advanced intelligent communications system. The advanced intelligent communications system may include a two-way communications network interconnecting a plurality of service switching points and a plurality of geographically dispersed network locations. The service switching points selectively establish a communication connection between at least two of the network locations in response to a call request from a calling party, one of the plurality of service switching points being a dedicated (or designated) service switching point of the private network to receiving incoming traffic for the private network. A service control point may include a call processing record including service logic for screening calls associated with the private network, the method may include receiving, at the designated service switching point, a call request from an off-network calling party to establish a communication connection terminating on the private network, forwarding call data, which may include an originating number of the off-network calling party, an authorization code, and a terminating number within the private network, collecting, at the service control point, the call data and accessing the call processing record associated with the private network, confirming, at the service control point, whether the off-network calling party is authorized to access the private network based on the authorization code, thereafter, if the off-network calling party is authorized to access the private network, verifying at the service control point whether the terminating number within the private network is authorized to receive the call request from the off-network calling party; and routing the call request to the terminating number, within the private network, if the terminating number is authorized to receive the call request from the off-network calling party.

In accordance with another aspect of the present invention, the method may further include denying the call request if the off-network calling party is not authorized to access the private network.

In accordance with still another aspect of the present invention, the method may further include denying the call request if the terminating number within the private network is not authorized to receive the call request from the off-network calling party.

In accordance with yet another aspect of the present invention, the step of confirming may include accessing a network authorization code table, which may include a plurality of valid authorized codes, at the service control point, determining whether there is a correspondence between the authorization code and any one of the plurality of valid authorized codes in the authorization code table; and validating the authorization code, such that the off-network calling party is authorized to access the private network when there is a correspondence between the authorization code and one of the plurality of valid authorized codes, and the off-network calling party is not authorized to access the private network when there is a not correspondence between the authorization code and any of the plurality of valid authorized codes.

In accordance with a further aspect of the present invention, the step of verifying may include accessing, at the service control point, a network screening table, which may include authorization data for indicating whether the terminating number is authorized to receive the call request, associated with the terminating number, and determining whether the terminating number is authorized to receive the call request based on the authorization data in the network screening table.

In accordance with yet another aspect of the present invention, the authorization data may include one of data indicating that the terminating number is authorized to receive calls, and data indicating that the terminating number is not authorized to receive calls.

In accordance with another aspect of the present invention, the step of collecting the call data may include collecting the originating number at the service control point in response to the call request, prompting the off-network calling party to input the terminating number, collecting, at the service control point, the terminating number inputted by the off-network calling party, prompting the off-network calling party, located at one of the network locations, to input the authorization code, and collecting, at the service control point, the authorization code inputted by the calling party.

In accordance with a further aspect of the present invention, the step of routing may include accessing a network screening table at the service control point, determining whether the call request can be routed to the terminating number by a direct trunk from the designated service switching point of the private network, connecting the call request to the terminating number by the direct trunk when it is determined that the call request can be routed by the direct trunk from the designated service switching point of the private network to the private network, accessing a network trunk group table at the service control point when it is determined that the call request cannot be routed by the direct trunk from the designated service switching point of the private network to the private network, the network trunk group table identifying a trunk group associated with the terminating number; and thereafter, connecting the call request to the trunk group associated with the terminating number in order to route the call request to the terminating number.

In accordance with still another aspect of the present invention, the network trunk group table may include an instate NPA-NXX routing table, the instate NPA-NXX routing table indicating the trunk group based on a NPA-NXX of the terminating number.

In accordance with yet another aspect of the present invention, the direct trunk may include one of a CENTREX group or PBX tie line.

In accordance with yet another aspect of the present invention, the method may further include the steps of receiving, at one of the service switching points, a call request from an on-network calling party to establish a communication connection originating from the private network, forwarding call data to the service control point, the call data may include an originating number of the on-network calling party and a terminating number, collecting, at the service control point, the call data and accessing a network screening table associated with the private network, the network screening table including authorization data identifying an authorization status of the on-network calling party to originate the call request from the private network, verifying, at the service control point, whether the on-network calling party is authorized to originate the call request from the private network based on the authorization data of the network screening table; and thereafter, if the on-network calling party is authorized to originate the call request from the private network, routing the call request to the terminating number.

In accordance with still another aspect of the present invention, the authorization data may include one of an authorization to originate calls without entering an authorization code and an authorization to originate calls with a valid authorization code.

In accordance with a further aspect of the present invention, the verifying may further include determining, based on the authorization data, whether an authorization code is required for authorization of the call request by the on-network calling party, and prompting the on-network calling party for an authorization code when the authorization code is required.

In accordance with still another aspect of the present invention, the method may further include collecting an authorization code inputted by the on-network calling party, accessing an authorization code table, at the service control point, the authorization code table may include a plurality of valid authorization codes, and determining whether the authorization code inputted by the on-network calling party matches any one of the valid authorization codes in the authorization code table, the verifying step verifying that the on-network calling party is authorized to originate the call request from the private network when it is determined that there is a match between the authorization code inputted by the on-network calling party and one of the valid authorization codes in the authorization code table.

In accordance with another aspect of the present invention, the method may further include denying the call request when it is determined that there is not a correspondence between the authorization code inputted by the on-network calling party and any of the valid authorization codes in the authorization code table.

In accordance with yet another aspect of the present invention, the method may further include denying the call request if the on-network calling party is not authorized to originate the call request from the private network.

Accordingly, another aspect of the present invention is directed to a system for screening calls associated with a private network in an advanced intelligent communications system. The advanced intelligent communications system may include a two-way communications network interconnecting a plurality of service switching points and a plurality of geographically dispersed network locations, the service switching points selectively establishing a communication connection between at least two of the network locations in response to a call request from a calling party, one of the plurality of designated service switching points of the private network to receiving incoming traffic for the private network. A service control point may include a call processing record including service logic for screening calls associated with the private network. The system may include a device for receiving, at the designated service switching point of the private network, a call request from an off-network calling party to establish a communication connection terminating on the private network, a device for forwarding call data to the service control point, the call data may include an originating number of the off-network calling party, an authorization code, and a terminating number within the private network, a device for collecting, at the service control point, the call data and accessing the call processing record associated with the private network, a device for confirming, at the service control point, whether the off-network calling party is authorized to access the private network based on the authorization code, a device for verifying, at the service control point, whether the terminating number within the private network is authorized to receive the call request from the off-network calling party, and a device for routing the call request to the terminating number, within the private network, if the off-network calling party is authorized to access the private network and the terminating number is authorized to receive the call request from the off-network calling party.

In accordance with another aspect of the present invention, the system may further include a device for denying the call request if the off-network calling party is not authorized to access the private network.

In accordance with yet another aspect of the present invention, the system may further include a device for denying the call request if the terminating number within the private network is not authorized to receive the call request from the off-network calling party.

In accordance with still another aspect of the present invention, the device for confirming may include a device for accessing a network authorization code table at the service control point, the authorization code table may include a plurality of valid authorization codes, a device for determining whether there is a correspondence between the authorization code and any one of the plurality of valid authorization codes in the authorization code table, and a device for validating the authorization code, such that the off-network calling party's authorization to access the private network is validated when there is a correspondence between the authorization code and one of the plurality of valid authorization codes, and the off-network calling party's authorization to access the private network is not validated when there is a not correspondence between the authorization code and any of the plurality of valid authorization codes.

In accordance with still another aspect of the present invention, the device for verifying may include a device for accessing a network screening table associated with the terminating number, the network screening table may include authorization data for indicating whether the terminating number is authorized to receive the call request, and a device for determining whether the terminating number is authorized to receive the call request based on the authorization data in the network screening table.

In accordance with a further aspect of the present invention, the authorization data may include one of data indicating that the terminating number is authorized to receive calls, and data indicating that the terminating number is not authorized to receive calls.

In accordance with another aspect of the present invention, the device for collecting the call data may include a device for collecting the originating number at the service control point in response to the call request, a device for prompting off-network calling party to input the terminating number, a device for collecting, at the service control point, the terminating number inputted by the off-network calling party, a device for prompting the off-network calling party, located at one of the network locations, to input the authorization code, and a device for collecting, at the service control point, the authorization code inputted by the off-network calling party.

In accordance with yet another aspect of the present invention, the device for routing may include a device for accessing a network screening table at the service control point, a device for determining, based on the network screening table, whether the call request can be routed to the terminating number by a direct trunk from the designated service switching point of the private network to the private network, a device for connecting the call request to the terminating number by the direct trunk when it is determined that the call request can be routed by the direct trunk from the designated service switching point of the private network to the private network, a device for accessing a network trunk group table at the service control point when it is determined that the call request cannot be routed by the direct trunk from the designated service switching point of the private network to the private network, the network trunk group table identifying a trunk group associated with the terminating number, and a device for connecting the call request to the trunk group associated with the terminating number in order to route the call request to the terminating number.

In accordance with a further aspect of the present invention, the system may further include a device for receiving, at one of the service switching points, a call request from an on-network calling party to establish a communication connection originating from the private network, a device for forwarding call data to the service control point, the call data may include an originating number of the on-network calling party and a terminating number, a device for collecting, at the service control point, the call data and accessing a network screening table associated with the private network, the network screening table including authorization data identifying an authorization status of the on-network calling party to originate the call request from the private network, a device for verifying, at the service control point, whether the on-network calling party is authorized to originate the call request from the private network based on the authorization data of the network screening table, and a device for routing the call request to the terminating number when the verifying device verifies that the on-network calling party is authorized to originate the call request from the private network.

In accordance with another aspect of the present invention, the device for verifying may further include a device for determining, based on the authorization data, whether an authorization code is required for authorization of the call request by the on-network calling party, and a device for prompting the on-network calling party for an authorization code when the authorization code is required.

In accordance with yet another aspect of the present invention, the system may further include a device for collecting an authorization code inputted by the on-network calling party, a device for accessing an authorization code table, at the service control point, the authorization code table may include a plurality of valid authorization codes, and a device for determining whether the authorization code inputted by the on-network calling party matches any one of the valid authorization codes in the authorization code table, the verifying device verifying that the on-network calling party is authorized to originate the call request from the private network when it is determined that there is a correspondence between the authorization code inputted by the on-network calling party and one of the valid authorization codes in the authorization code table.

In accordance with still another aspect of the present invention, the system may further include a device for denying the call request when it is determined that there is not a correspondence between the authorization code inputted by the on-network calling party and any of the valid authorization codes in the authorization code table.

In accordance with a further aspect of the present invention, the system may further include a device for denying the call request if the on-network calling party is not authorized to originate the call request from the private network.

The above-listed and other objects, features and advantages of the present invention will be more fully set forth hereinafter.

BRIEF DESCRIPTION OF THE DRAWINGS

The present invention is further described in the detailed description that follows, by reference to the noted plurality of drawings by way of non-limiting examples of preferred embodiments of the present invention, in which like references numerals represent similar parts throughout the several views of the drawings, and wherein:

FIG. 4 shows an example of a network screening table of the present invention;

FIG. 6 shows an example of a Direct Connection Trunk Group table of the present invention;

FIG. 7 shows an example of an NPA-NXX Trunk Routing table of the present invention; and FIG. 8 shows an example of a 700-RXX table of the present invention.

DETAILED DESCRIPTION OF THE PREFERRED EMBODIMENTS

Many telephone services may be provided using an AIN or AIN-type network for centralized control of telephone services offered to subscribers, as opposed to localized control of services at the Central Office (CO). The AIN system is provided through interaction between switching points and other systems supporting AIN logic.

The intelligent network screening service of the present invention may be implemented using at least AIN Release 0.0 protocols and advanced intelligent network capabilities which are provided by a telephone company, i.e., programmable service control points (SCPs), central offices equipped with AIN service switching point (SSP) features, and existing Common Channel Interoffice Signaling (CCIS) networks. The Signaling System 7 (SS7) network is a widely used CCIS network that provides two-way communication of Transaction Capabilities Application Protocol (TCAP) formatted data messages between the SCP and the STP. The telephone network essentially employs an upper-level software network through the STPs and the SCP. The software resides over the hardware to check the call route and the availability of connection prior to hardware connection.

Figure 1:
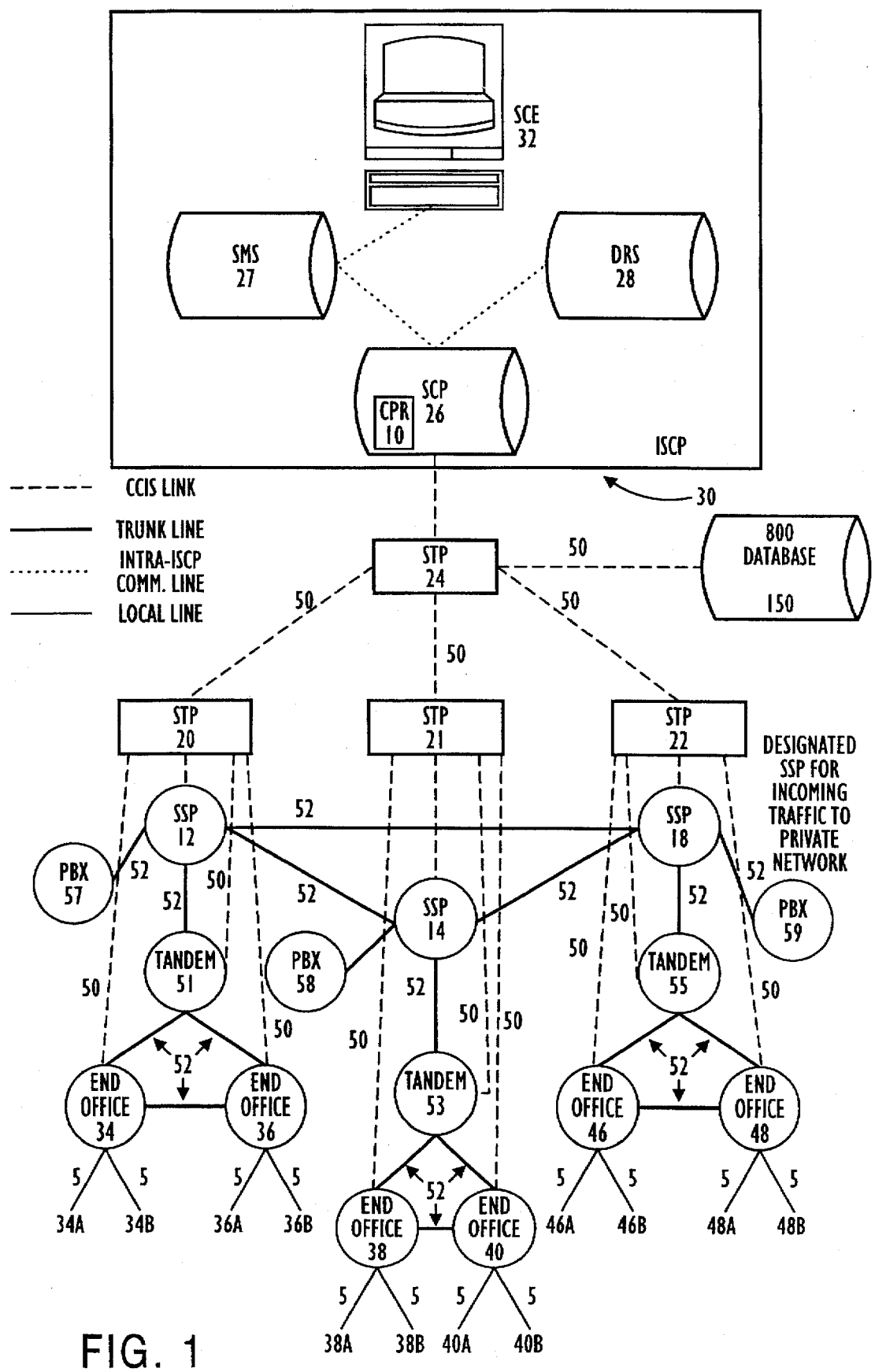
FIG. 1 illustrates, in a general block diagram form, an Advanced Intelligent Network (AIN) system for implementing the intelligent network screening features of the present invention.

Referring now to the accompanying drawings, FIG. 1 illustrates a general block diagram of an Advanced Intelligent Network (AIN) in which an apparatus and method for intelligent network screening is embodied in accordance with the present invention. In FIG. 1, local telephone lines 5 connect a plurality of individual locations 34A–48B in each geographic area to the closest Central Office (CO), or end office. In turn, the central offices (end offices) are connected via trunk to tandem switches 51, 53, and 55 that provide access to a plurality of service switching points 12, 14, and 18 of the private network. In FIG. 1, each CO is shown as a Service Switching Point (SSP) 12, 14, and 18. The SSPs may include, but are not limited to, 5ESS, 1AESS, and DMS-100 switches. If 5ESS switches are utilized, then these switches should be equipped with Generic 5E8 (or higher) and provided the necessary trigger requirements (discussed below) in order to serve subscribers. Any 1AESS switches should be equipped with Generic 1AE12.01 (or higher) and provided the necessary trigger requirements in order to serve subscribers. For DMS switches, BCS-35 or BCS-36 and the necessary trigger features should be provided.

For purposes of illustration, only three SSPs are shown in FIG. 1. However, more (or less) than three SSPs may be utilized. The SSPs 12, 14, and 18 are programmable switches which: recognize AIN-type calls; launch queries to an Integrated Service Control Point (ISCP) 30; and, receive commands and data from the ISCP 30 to further process and route AIN-type calls. When one of the SSPs 12, 14, and 18 is triggered by an AIN-type call, the SSP formulates an AIN service request and responds to call processing instructions from the network element in which the AIN service logic resides. The AIN service logic may reside in a database at the Service Control Point (SCP) 26. The SSPs 12, 14, and 18 are connected by trunked communication lines 52 which are used to connect and carry telecommunication signals, e.g., voice and/or data, from a calling party to a called party.

In FIG. 1, the SSPs 12, 14, and 18 are equipped with Common Channel Inter-Office Signaling (CCIS) capabilities (or, alternatively, Common Channel Signaling (CCS)), e.g., Signaling System 7 (SS7), which provides for two-way communications of data messages between each SSP 12, 14, and 18 and the ISCP 30 via CCIS links 50. The data messages are formatted in accordance with the Transaction Capabilities Applications Protocol (TCAP). As shown in FIG. 1, SSP 12 is connected to a first local area Signaling Transfer Point (STP) 20 by SS7 link 50. SSP 14 is connected by SS7 link 50 to STP 21, and SSP 18 is connected, via SS7 link 50, to STP 22. The connections by links 50 to the STPs are for signaling purposes, and allow the SSPs to send and receive messages to and from the ISCP 30. Each of the STPs can be connected to a large number of other STPs. For purposes of illustration in FIG. 1, SS7 links 50 are shown as connecting local STPs 20, 21, and 22 to a regional STP 24 and connecting the regional STP 24 to the ISCP 30.

The ISCP 30 is an integrated system which may include a Service Management System (SMS) 27, a Data and Reports System (DRS) 28, a programmable Service Control Point (SCP) 26, and a Service Creation Environment (SCE) 32. The SCE 32 is a terminal that may be implemented to work with the SMS 27 to create, modify, and load services into the database in the SCP 26. The SCP 26 executes software-based service logic and returns call routing instructions to the SSPs. The SMS 27 and the DRS 28 may be provided for compiling calling information to be used for billing and administrative purposes. By way of example, the ISCP 30 may implemented with the Bellcore Integrated Service Control Point (ISCP), loaded with ISCP software Version 3.4, available from Bell Telephone Laboratories, Inc., Murray Hill, N.J.

When a non-AIN phone call is initiated from, for example, party A at location 34A in FIG. 1, the call is directed to the end office 34 serving the calling location 34A. While each of the end offices 34-48 and tandem offices 51-53 may not be AIN-type SSPs, they are SS7 SSPs, and, therefore, part of the software data network. When the end office 34 receives the originating call, the call is suspended and the software network takes over the routing and connecting of the call. Normal call processing begins when an originating station 34A is off-hook and the end office 34 receives dialed digits (the telephone number of the party at station 34B) from the originating station. End office 34 analyzes the digits and determines the call type, i.e., intraswitch or interswitch. An intraswitch call, i.e., a local call, directly connects calling station 34A with called station 34B without any querying outside of end office 34, serving both stations.

When the called station, for example, a party at station 36B, is not served by the same end office as originating station 34A, further processing may be necessary. In this situation, and assuming an entire SS7 network, the originating call from station 34A is suspended at the end office 34, which further sends a query message through one or more of the local STPs 20, 21, 22, and/or regional STP 24 to offer termination of the call. The query message is routed to terminating end office 36, the end office serving called station 36B. If station 36B is off-hook, i.e., busy, terminating end office 36 responds to the query from end office 34 that the call cannot be connected, and a busy signal is transmitted to calling station 34A. If station 36B is on-hook, end office 36 responds to the query of originating end office 34 by transmitting a ringback signal to calling station 34A, which is then serially connected through the trunked communication lines 52 to end office 36 and from end office 36 to called station 36B. However, if the network is not completely SS7, the voice path may be built one link at a time. That is, the trunk from end office 34 to end office 36 may be connected prior to end office 36 checking on the status of the line 5 to location 36B.

Advanced Intelligent Network (AIN) call processing differs from standard telephone call processing in that a query to a centralized database, e.g., ISCP 30, is triggered by an AIN application. In AIN-type call processing, an SSP is responsible for identifying calls associated with AIN services, detecting when conditions for AIN service involvement are met, formulating service requests for call processing instructions, and responding to the instructions received. As with normal call processing, when the call is suspended at the calling party's end office, the end office of the originating call may send a data message, via the SS7 links 50, to the STPs to establish the call route. AIN services are created by assigning appropriate SSP call suspension points, known as AIN "triggers", accessed via customer lines or telephone numbers, and accessing customer or service-specific logic in the ISCP 30. Ideally, AIN service should be triggered at the earliest possible point in the call, i.e., at the originating end office; however, service providers may only be able to provision the network with AIN triggers residing in the COs serving the subscribing customer or at an intermediate point on one of the connecting trunks, which is the case in the illustrated embodiment. Accordingly, the SSPs launching the AIN queries are SSPs 12, 14, and 18, even if the end offices 34-48 are AIN SSPs. This allows SSPs 12, 14, and 18 to use trunks 52 or other facilities, i.e., inter-LATA, international, etc. Thus, if an originating call through SSP 12 encounters an AIN trigger, i.e., a call requiring AIN service involvement, the SSP 12 suspends call processing, then queries the ISCP 30 through the STPs 20 and 24 over the SS7 links 50.

For purposes of illustration, assuming that originating station 34A (a non-AIN subscriber) offers connection to station 36B (an AIN subscriber), the ideal location for triggering AIN is when the call is initially suspended at end office 34, as discussed above. As with a normal telephone call, a query from end office 34 to end office 36 through STP 20 via SS7 may be launched. As a result, a trunk connection may be established between end offices 34 and 36 without an AIN query being triggered. However, assuming that end offices 34 and 36 are equipped with AIN SSPs (e.g., terminating attempt triggers), then, upon the establishment of the trunk connection between end offices 34 and 36, the AIN trigger would be actuated.

In general, the originating end office 34 suspends the call and an SS7 connection to the terminating end office 36 may be established through STP 20. When the trunk connection between end offices 34 and 36 is established, or when end office 36 is queried, the AIN trigger may be actuated and a query may be launched to the ISCP 30, through STPs 20 and 24. The query may be in TCAP format and identify the calling station (originating end office 34) and dialed digits (the number of AIN subscriber at location 36B).

Upon receipt of the query message from the AIN SSP at end office 36, the ISCP 30 executes software based service logic programs stored in the SCP 26 to perform subscriber functions, e.g., call screening, and returns a response to the end office 36 with call routing instructions. The AIN service application may be stored in an ISCP database, e.g., the SCP 26, and accessed by a predetermined SSP trigger.

As implemented in the preferred embodiment of the present invention, the SSPs of the private network, i.e., SSPs 12, 14, and 18, are supplied with AIN origination triggers. Additionally, a certain SSP, e.g., SSP 18, is designated as the SSP to receive all incoming traffic for the private network.

Central offices equipped as AIN SSPs allow normal switch call processing to be suspended at specific points in a telephone call, enabling TCAP formatted query and response messages to be transmitted between the SSP and ISCP. AIN queries will be routed from a central office or switching service point to a local STP using existing SS7 links. These queries will then be routed from the local STP to the regional STP, and from the regional STP to the ISCP. The SS7 message routing should be devised to minimize the need for data administration at the local and regional STPs. A capability code may be established at the STPs that serve the SCP. This capability code is used by the SSPs and the STPs to do point code routing until the message is received by the "last" STP pair (that is, serving the SCP). Once the message is received by this STP pair, routing to the appropriate SCP can be accomplished via a six digit global title translation (NPA-NXX pairs would have to be administered in the routing tables of the last STP pair).

As noted above, new services may be created by assigning appropriate SSP AIN triggers to customer lines or telephone numbers to access customer and/or service-specific logic in the ISCP. The intelligent network screening features of the present invention, for both incoming and outgoing calls, may be provisioned via originating SSP triggers if the SSP is implemented with either a 5ESS or a DMS-100 switch.

An originating SSP trigger may be required for every off-network extension of the private network that is to be treated like an on-network station for the purpose of making outgoing calls to other stations on the private network, to include those like itself, or through the private network's switches (or gateways) to off-network destinations to include intrastate, interstate, and international. These triggers will be encountered at the private network's switches as calls reach them over incoming trunk groups from public tandem switches.

Originating SSP triggers are required only for the telephone numbers providing incoming call access to the private network's switch(es) providing on-network terminating service to off-network switches as calls reach the access telephone number on the switch(es).

As an alternative, AIN triggers may be established according to any of a variety of switches and switch software. Therefore, AIN triggers may be established according to terminating telephone number, billing number, etc.

When the ISCP 30 receives a query, the intelligent network screening service logic will be executed. Call data may be collected and recorded in the DRS 28, as per the normal ISCP SAMPLE node operation. For example, the ISCP 30 may contain resident service software that collects the calling (originating) telephone number, called (terminating) telephone number, the date, and the time of each query to the ISCP 30. A call processing record 10 may also be provided that is stored within the SCP 26. The CPR 10 may contain the service logic for network screening and call routing. The features of the CPR 10 are more fully discussed below with reference to FIGS. 2, 3A, and 3B.

After the ISCP 30 has collected the call data, the ISCP 30 will then return control of the call, via a trunk group number and a routing number, to the call suspending SSP for termination. The routing number for this service will generally be the telephone number dialed by the calling party, either after access to the private network has been gained or after being prompted by the CPR 10 to input the terminating number, and used by the SSP to complete the call as dialed.

Once the subscribed service logic has been completed, control of the originating call may be returned to the triggering SSP. To complete the originating phone call, the ISCP service logic for this service must respond to the SSP query in one of two possible responses. As noted above, the call may be routed via a trunk group number and a routing number in a TCAP connect message. The trunk group must be returned in the primary trunk group parameter of the TCAP connect message. The ISCP service logic must have detailed knowledge of trunk group identifiers, route index numbers, and individual SSPs in order to create service for a customer. This information may be obtained during a service order process and may require that translation groups be consulted to complete such supplemental service order/provisioning information.

INTELLIGENT NETWORK SCREENING

Figure 2:
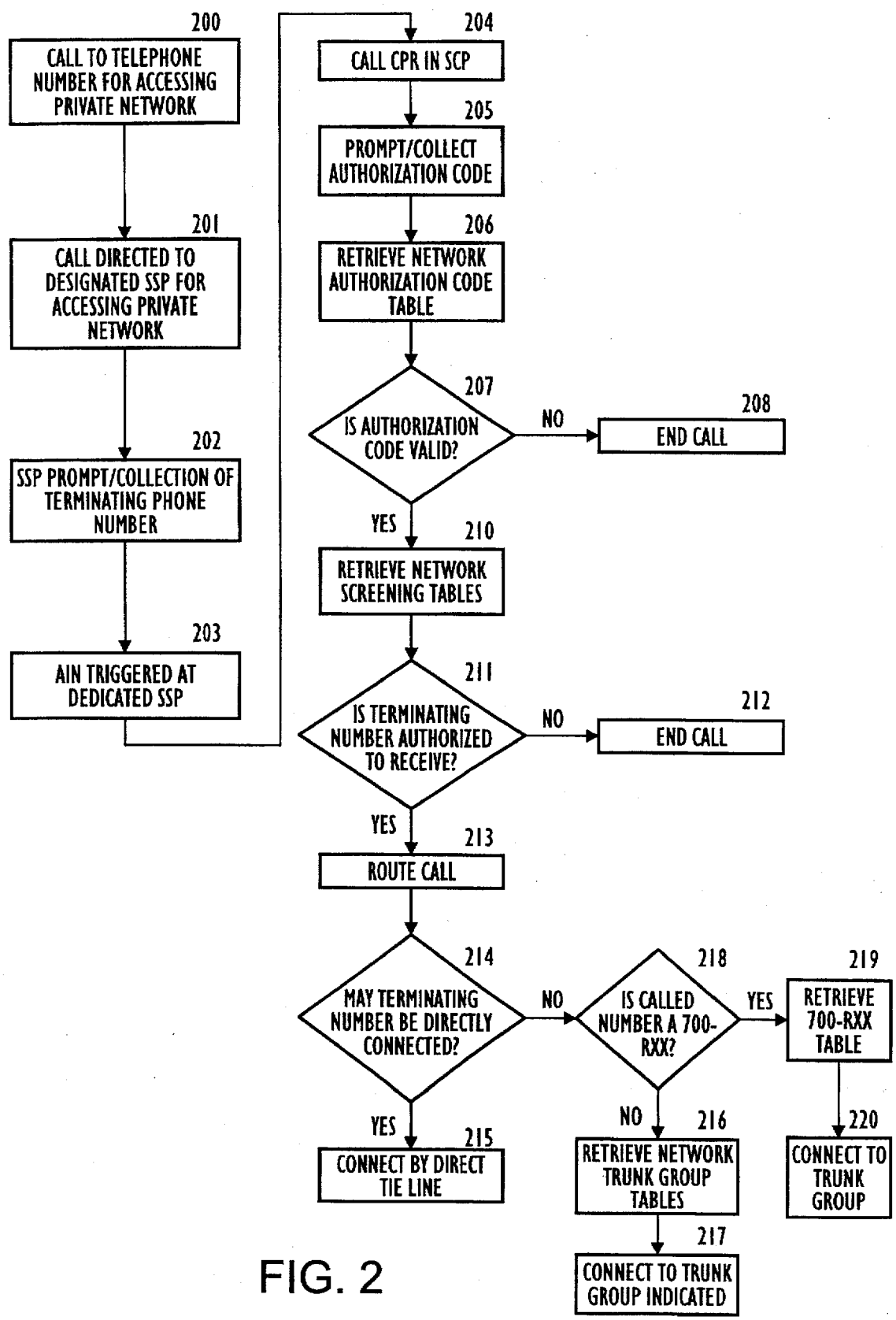
FIG. 2 shows a flow diagram of an incoming call to or through a network screening process of the present invention.

The overall operation of the network screening feature and logic of the present invention will now be discussed with reference to FIG. 2. For the purposes of illustration, FIG. 2 shows a flow diagram of an example of the screening of an incoming call to be terminated on the private network, where the calling station 34A is located at station 34A and the private network is located at PBX or CENTREX locations 57 (see FIG. 1). A CENTREX location basically allows all telephone stations for a business, whether connected to a PBX or directly connected to a central office, to have their own telephone numbers for receiving calls and for the billing of outgoing calls. The telephone stations look like they are directly connected to a telephone central office even if they are not. When an originating off-network call is placed into the CENTREX network, the originating party may be treated as an on-network caller (or virtual on-network station). One SSP (e.g., SSP 18) may be designated (or dedicated) for receiving incoming traffic to the private network. Further, the private network may limit access to the network to "800-type" call service (or an associated local access number) or specialized service numbers (e.g., "700" or "888" service numbers).

I. Incoming Calls Terminating on the Network

As shown in FIG. 2, an off-network caller (i.e., a caller at location 34A that is not connected with the private network) may place a telephone call to access the private network at step 200. In response to the call or service request, the call is directed, at step 201, through the network to the dedicated SSP 18 for accessing the private network. SSP 18 may be a dedicated service switching point of the private network designated to receive all incoming traffic for the private network. SSP 18, at step 202, prompts for, and collects, the desired terminating telephone number from the calling party. At step 203, the AIN trigger is recognized. The SSP 18 then queries the ISCP 30 at step 204 so that the CPR 10 associated with the network screening service for the private network may be accessed. Based on the CPR 10, the ISCP 30 then formulates a response message (again in TCAP format) to instruct the designated SSP to prompt for and collect an authorization code from the calling party at step 205. In accordance with an aspect of the present invention, the ISCP 30 may send the instruction message directly to the dedicated SSP 18 of the private network.

After the authorization code is entered by the calling party at location 34A has been collected and sent to the ISCP 30, an authorization code table is accessed at step 206. The authorization code table, which may be stored in a database within SCP 26, is used by the ISCP 30 to determine whether the authorization code entered by the calling party is valid. If the ISCP 30 determines that the code is not valid at step 207, then the calling party at station 34A is not authorized to access the private network and the ISCP 30 may instruct the designated SSP to end the call at step 208. However, if the ISCP 30 at step 207 determines that a valid authorization code has been entered, then the calling party is authorized to access the network and the screening process continues to step 210.

At step 210, a network screening table is accessed. The network screening table (see FIG. 4) may be stored in a database within SCP 26 and is used by the ISCP 30 to determine whether the terminating number within the private network is authorized to receive the call request from the calling party. An exemplary screening table of the present invention is discussed below with reference with to FIG. 4.

In an alternative approach, step 202 may follow step 203. That is, instead of the designated SSP 18 performing the prompt/collect terminating telephone number step, the prompt/collect may be the first step performed by the CPR 10.

If the ISCP 30 determines that the terminating number is not authorized to receive the call at step 211, then the calling party is not authorized to call the terminating number and the ISCP 30 may instruct the designated SSP to end the call at step 212. Alternatively, the ISCP 30 may instruct the designated SSP to prompt the calling party for another terminating number within the private network and again evaluate whether the call is authorized. In such a case, a calling party could be given a predetermined number of attempts (e.g., 3 attempts) to enter a valid terminating number before ISCP 30 instructs the designated SSP to terminate the call.

Referring again to step 211, if the ISCP 30 determines that the terminating party is authorized to receive the call, then the ISCP 30 determines that the designated SSP may route the call to the terminating location at step 213. The ISCP 30 may instruct the designated SSP to route the call in accordance with steps 214–220, which are discussed immediately below.

As shown in FIG. 2, based on the CPR 10, the ISCP 30 determines, at step 214, whether the terminating location is available by direct connection from the triggering SSP 18 (see FIG. 6). If direct connection is available, the call may be terminated from the dedicated SSP 18 of the private network via a direct trunk PBX or CENTREX location at step 215. If direct connection is not available, the system may determine whether a 700-RXX number has been dialed at step 218. If a 700-RXX number has not been dialed, the CPR 10 may access an instate NPA-NXX trunk table (see FIG. 7), at step 216, to determine which trunk to connect to the triggering SSP 18 of the private network so that the call may be sent to the terminating location at step 217.

If a 700-RXX number has been dialed, the ISCP 30 may retrieve a 700-RXX table at step 219. Each 700-RXX number is assigned a screening code that may enable the ISCP 30, at step 220, to determine which SSP of the private network, and which trunk therefrom, provides direct connection to the dialed 700-RXX termination location.

In accordance with an aspect of the present invention, a single network switch, e.g., SSP 18, may be dedicated as the only switch to handle all incoming calls to the private network. The private network may be accessed, for example, by an "800-type" access number or local access telephone number. When the private network access request from an off-network caller is received at the dedicated SSP 18 of the private network, the number dialed by the calling party, e.g., 1-800-123-4567, to gain access into the private network triggers control of the incoming call to an 800 database 150 with a look-up table. The number 800-123-4567 may be associated, for example, with a predetermined routing number, e.g., 314-987-6543, to which the calling party's "800" call is transferred. The dedicated SSP associated with phone number 314-987-6543, i.e., SSP 18, includes an originating trigger that will cause the SSP 18 to query the ISCP 30. Based on the query message from the SSP 18, the ISCP 30 will access the CPR 10, resident in the SCP 26, to run the service logic associated with the network screening service for calls to the network.

In accordance with the present invention, the CPR 10 will generally contain all of the service logic necessary to perform both incoming and outgoing screening for the private network. However, if CPR 10 cannot be accessed directly, short trigger CPRs, one for incoming and one for outgoing, may be used to transfer control of a specific call on a specific facility with a specific trigger to CPR 10. As another alternative, CPR 10 may either contain, as fully integrated, or access separate service logic which may perform call sampling and measurements for the screening. These types of measurements may include: creating station message detail recording (SMDR) files; peg counting outgoing triggers without screening table entries; and creating a file to eliminate outgoing triggers without screening table entries.

In the call screening system for incoming calls, the incoming call can be made from, for example, a private network authorized user calling from an off-network telephone location. The calling party may be given a special authorization code by the private network subscriber for access into the network. However, not only does the caller need authorization to access the network, but the caller may be limited to only access telephone numbers within the network that have been authorized as terminating numbers.

In providing the incoming call screening application, the CPR 10 of the ISCP 30 is required to perform two separate screening functions: an authorization code validation at step 207; and an authorization for termination validation at step 211. As noted above, the designated SSP 18, at step 202, may prompt the calling party to enter the desired terminating telephone number and the ISCP 30 may instruct the designated SSP to prompt the calling party to input an authorization code at step 205. Such prompts from the SSP may include a voice prompt (e.g., "Please enter your network authorization code number") and/or a stutter tone prompt. In response to such prompts, the calling party may enter the values via a Dual Tone Multi-Frequency (DTMF) touch tone keypad or, if supported by the implemented AIN Release series, by voice command. Alternatively, if the call originates from a rotary phone, after a predetermined time-out, the ISCP 30 may instruct the dedicated SSP to transfer the call to a network operator. The operator could then add a trunk to the dedicated switch of the private network with digit collection and triggering facilities, so that the operator could input the authorization code for the rotary phone user. The trunk established between the dedicated SSP of the private network to the operator could stay up for the duration of the call by the rotary phone user.

Referring again to FIG. 2, a brief description of the service logic flow for network screening will be discussed, in accordance with features of the present invention, for situations where: the calling party is authorized to access the private network; and the terminating number is authorized to receive the call request from the calling party.

A. Entry of Terminating Number

Prior to the ISCP 30 determining whether the calling party is authorized access to the private network, the designated SSP 18, at step 202, prompts the caller and collects the terminating telephone number. After the terminating number entered by the calling party has been collected, it is sent to the ISCP 30 at step 204.

B. Authorized Calling Party

As noted above, the ISCP 30 instructs the SSP to prompt for and collect an authorization code from the calling party at step 205. Upon receipt of the authorization code from the calling party, the ISCP confirms that the authorization code entered by the calling party is valid at step 207, after accessing the authorization table at step 206. In order to determine whether the authorization code is valid, the ISCP 30 may compare the code entered by the calling party with the values in the authorization code table.

If a correspondence is not found based on the authorization code table, the ISCP 30 may instruct the SSP to end the call at step 208. Alternatively, the ISCP 30 may instruct the SSP to prompt the user to reenter an authorization code, and again analyze the code entered by the calling party for validation. In such a case, the calling party may be given a predetermined number of attempts (e.g., three attempts) to enter a valid authorization code before the ISCP 30 instructs the SSP to end the call. In accordance with another aspect of the invention, the ISCP 30 may direct the SSP or an intelligent peripheral (IP) to play a failure announcement to the calling party when a correspondence is not found. Such a failure announcement could include, for example, an announcement that "Your call cannot be completed because you entered an invalid authorization code number."

If the authorization code entered by the calling party is determined by the ISCP 30 to be valid at step 207, then the call may be furthered processed at steps 210–211 with the terminating number collected at step 202 to determine whether the terminating telephone number is an authorized number to receive the call from the off-network calling party.

C. Authorized Terminating Number

Once the ISCP 30 concludes that the calling party is authorized to access the private network, the ISCP 30 may then confirm whether the terminating (called) party is authorized to receive, i.e., terminate, the call from the calling party. For this purpose, a network table may be accessed at step 210.

The network screening table may be stored in a database within SCP 26 and used by the ISCP 30 to determine whether the terminating number within the private network is authorized to receive the call request from the calling party.

In accordance with an aspect of the invention, the ISCP 30 may maintain a plurality of telephone number screening tables that are stored within the SCP 26 to indicate the various authorization levels associated with each number. Each table may be sorted according to the NPA of the terminating numbers. Accordingly, it may be necessary to provide an additional table as a key or guide to selecting the proper screening table. For example, if a telephone number 214-987-6542 is entered as the terminating telephone number, the area code (e.g., 214) of the terminating number may act as the key to selecting the proper screening table. The terminating number, found in the screening table, may be denoted as: authorized to terminate calls only; authorized to originate calls only; authorized to originate calls without entering an authorization code and authorized to terminate calls; or authorized to originate calls with a valid authorization code and authorized to terminate calls, etc. As long as the terminating number, according to the screening table, is authorized to terminate (i.e., receive) the call from the calling party, then ISCP 30 determines at step 211 that the terminating number is authorized to receive the offered call. As shown in FIG. 2, the terminating number must be authorized before the off-network telephone call may be terminated to the called party (i.e., before the call may be routed to the terminating party).

If the ISCP 30 determines at step 211 that the terminating number is not authorized to receive the call, then at step 212 the call is not completed. In accordance with the present invention, at step 212, the SSP may provide an appropriate message to the calling party, e.g., "Your call cannot be completed to the number you have indicated," when a terminating number associated with an unauthorized terminating party is entered. In addition to the above message, the system may instruct the calling party to contact service personnel in order to correct a system error (if necessary), or to update the screening table. Further, the calling party may be instructed to enter "0" for the dialed number to reach the network operator.

Alternatively, when is it determined that the terminating number is unauthorized, the ISCP 30 may instruct the SSP to prompt the user for another terminating number, and again analyze the number entered by the calling party for validation. In such a case, the calling party may be given a predetermined number of attempts (e.g., three attempts) to enter a authorized terminating number before the ISCP 30 instruct the SSP to end the call at step 212.

D. Routing of the Call

Referring now to FIG. 4, routing of the call based on an exemplary screening table of the present invention will now be discussed.

As noted above, a network screening table may be created, modified, and stored in the database within SCP 26 and used by the ISCP 30 to determine whether the terminating number within the private network is authorized to receive the call request from the calling party. In accordance with the present invention, the screening table (see FIG. 4) may include data regarding the terminating number, e.g., indicating the terminating number as being either: authorized to terminate calls only; authorized to originate calls without entering an authorization code and authorized to terminate calls; or authorized to originate calls with a valid authorization code and authorized to terminate calls, etc.

As shown in FIG. 4, for routing calls to their desired terminating party, the screening table may also include, for example, data for determining whether, and by what method, a call terminates on the private network; i.e., whether a direct trunk connection may be established between an SSP of the private network and a PBX or CENTREX group. In addition to information regarding authorization to originate and/or terminate calls, the screening tables may additionally store data regarding routing to the terminating number. The screening code may consist of, for example, a 2-digit number. The first digit may be, e.g., numerals 1–5, and may indicate the user's authority to originate or terminate calls on the private network. For example, "1" may denote authority to terminate calls only, "2" may denote authority to originate calls without an authorization code, "3" may denote authority to originate calls with a valid authorization code, "4" may denote authority to originate calls without an authorization code but not terminate calls, and "5" may denote authority to originate calls with a valid authorization but not terminate calls. The second digit of the screening code may be used to determine whether a call terminates to PBXs or CENTREXs via directly connected trunks and to which SSP of the private network the PBX or CENTREX is directly connected. The second digit may be, e.g., numerals 0–3, and may identify the SSP of the private network that provides a direct PBX or CENTREX connection to the termination location. For example, "0" may denote that the termination location is not available for direct PBX or CENTREX connection, "1" may denote that the termination location is available for direct PBX or CENTREX connection from SSP 12, "2" may denote that the termination location is available for direct PBX or CENTREX connection from SSP 14, and "3" may denote that the termination location is available for direct PBX or CENTREX connection from SSP 18. In other words, the ISCP 30 may access the screening table to determine at step 214 in FIG. 2 whether the called party is directly connected to the private network via a trunk line to the dedicated switch SSP 18 of the private network, i.e., the SSP that triggered the AIN query. CENTREX groups and PBXs may be directly terminated on the dedicated switch of the private network either with two-way or one-way trunk lines.

As illustrated in FIG. 6, the office route numbers (or route index) may be arranged in a Direct Connection Trunk Group table as a directory table so that the routing information may be determined based on the route index associated with the terminating number. The granularity required in the screening table for CENTREX and PBX tie lines that are directly terminated on the dedicated switch of the private network may range from the ten thousands block down to single numbers, i.e., from NPA-NXX to NPA-NXX-XXXX. Each SSP of the private network may have a Direct Connection Trunk Group table associated with it. The office route numbers enable the SSP to find a direct physical connection to send an outpulse of called number digits.

Referring back to FIG. 2, once the ISCP 30 determines at step 214 that the terminating number can be directly connected, call processing proceeds to step 215 so that the call may be returned to the SSP that triggered the AIN query and the connection may be completed. The ISCP 30 may return a trunk group number and a routing number. Hence, the service logic at the ISCP 30 selects a trunk group and tells the SSP launching the query which trunk group to use and what called telephone number to send as the called party. In accordance with the present invention, a trunk routing table, e.g., an Instate NPA-NXX Trunk Routing table (see FIG. 7), that permits an office route number to be selected based on NPA-NXX for that switch, may be used by the ISCP 30. As shown in FIG. 7, the instate NPA-NXX table identifies each SSP of the private network. For each NPA or NPA-NXX entry in the table, a route office number (or route index) may be associated with each SSP of the private network to identify the trunk on which to route the telephone call for termination. If the trunk routing table does not have an office route number for the NPA-NXX of the switch, the trunk routing table may provide an office route number to be selected based on NPA for that switch. The office route number may point to a trunk group going to another network switch, to Feature Group B trunks, to a Local Access and Transport Area tandem, or to a Leaky PBX that may tandem the call for local completion.

If, however, the terminating number entered by the originating calling party is a specialized 700-RXX number related to the private network, e.g., a "700-type" service number, the 700-RXX number may be directly connected just as any other terminating number on the network by consulting a 700-RXX table, as shown in FIG. 8. Each 700-RXX number is directly connected to the one of SSPs of the private network and each 700-RXX number is given screening code indicating terminating only, e.g., first digit "1". If a given 700-RXX number is directly connected to the dedicated SSP handling the query, the call may be routed just like any other direct connection telephone number. However, if the terminating number is a 700-RXX number directly connected to a non-querying SSP of the private network, a 700-RXX table (FIG. 8) from each SSP of the private network may be retrieved by the ISCP 30. The ISCP will determine, based on the screening code, which SSP of the private network provides direct connection to the terminating 700-RXX number and route the call on the trunk group of the SSP of the private network indicated as the direct connecting SSP. Thus, the call is directed to the SSP with direct connection to the terminating 700-RXX number.

If the dedicated SSP of the private network is a LATA tandem with trunks that go out of the "LATA Tandem" side of the switch on physical facilities and wrap back to the "private network" side of the switch, the service logic and the associated service tables at the ISCP 30 should work as if each side of the switch was a physically separate entity.

When the control of an incoming call is returned from the ISCP 30 to the private network SSP that launched the query, i.e., the dedicated SSP 18, if the trunk group number points to a facility that is already fully utilized, software of the switch underlying the SSP functionality may be used to overflow the call to alternate routes. For example, ISCP 30 may instruct dedicated SSP 18 to send the call over tie lines to a directly connected PBX, but the switch may overflow the call to a leaky PBX or to Feature Group B trunks going to a LATA tandem if the tie lines are currently being fully utilized.

D. Report Generation

In accordance with another aspect of the present invention, it is possible for the ISCP 30 to collect and generate reports on call activity associated with a private network. In the ISCP 30, call sampling may be performed by the DRS 28 to record the data the private network subscriber needs for allocating costs, etc. Such call activity data may include: the called party number, the authorization code entered by the calling party, the date and time (in, for example, "min:sec" format) for every call, and other billing information for the subscriber. The DRS 28 may format this data as needed to create Station Message Detail Recording (SMDR) records. The SMDR records may be transferred electronically to a billing access system of the telephone service provider to the subscriber. An example of a service for formatting DRS call activity data and for transferring the SMDR records is disclosed in copending U.S. Ser. No. 08/473,919 filed on Jun. 7, 1995, entitled "Apparatus and Method for Recording Call Related Data", in the names of Harold C. Fleischer III et al., the disclosure of which is expressly incorporated herein by reference in its entirety.

II. Calls Originating from the Network

Figure 3A:
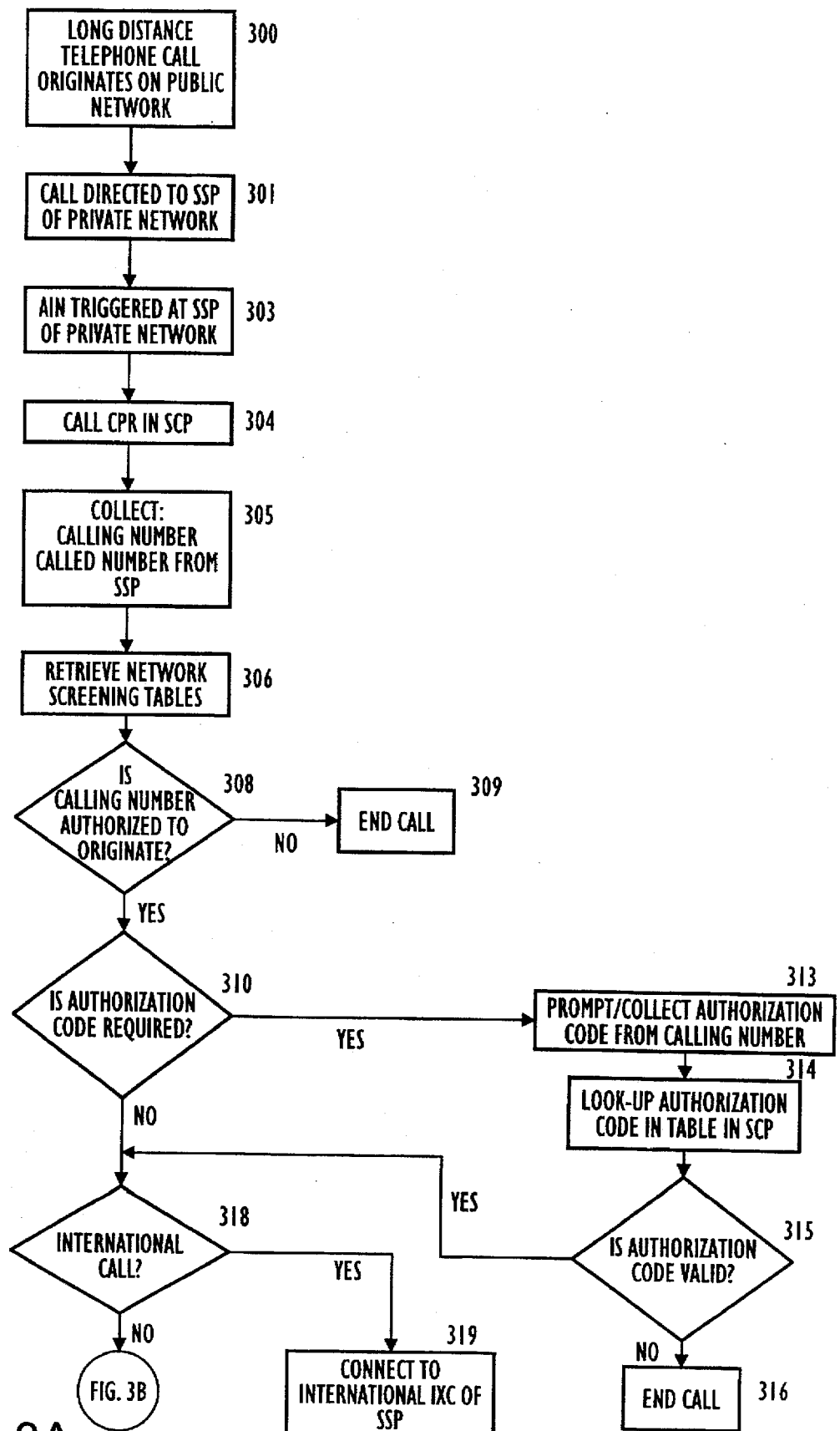
FIGS. 3A and 3B show an outgoing long distance call going through a network screening process in accordance with the present invention.
Figure 3B:
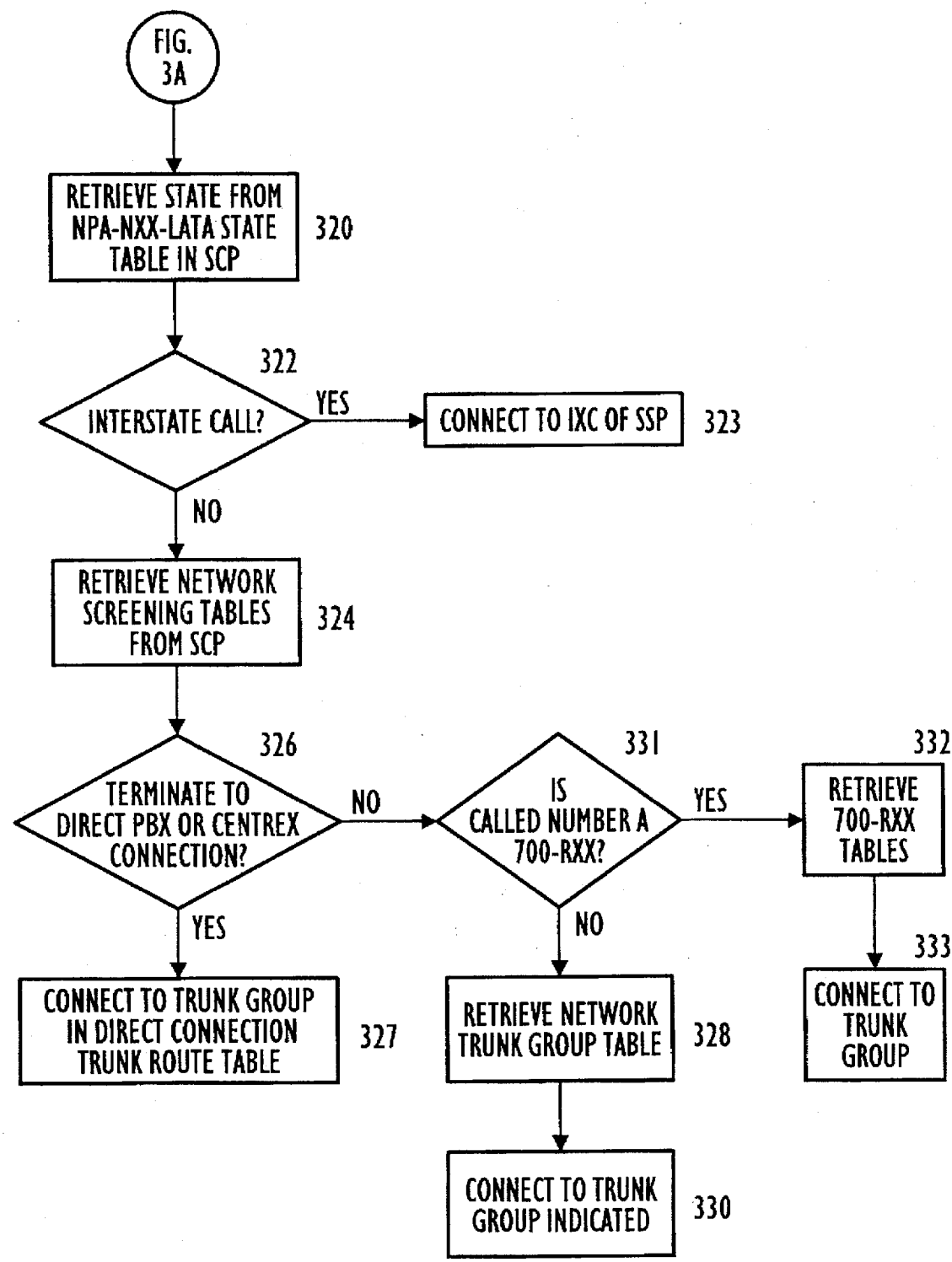
Figure 5:
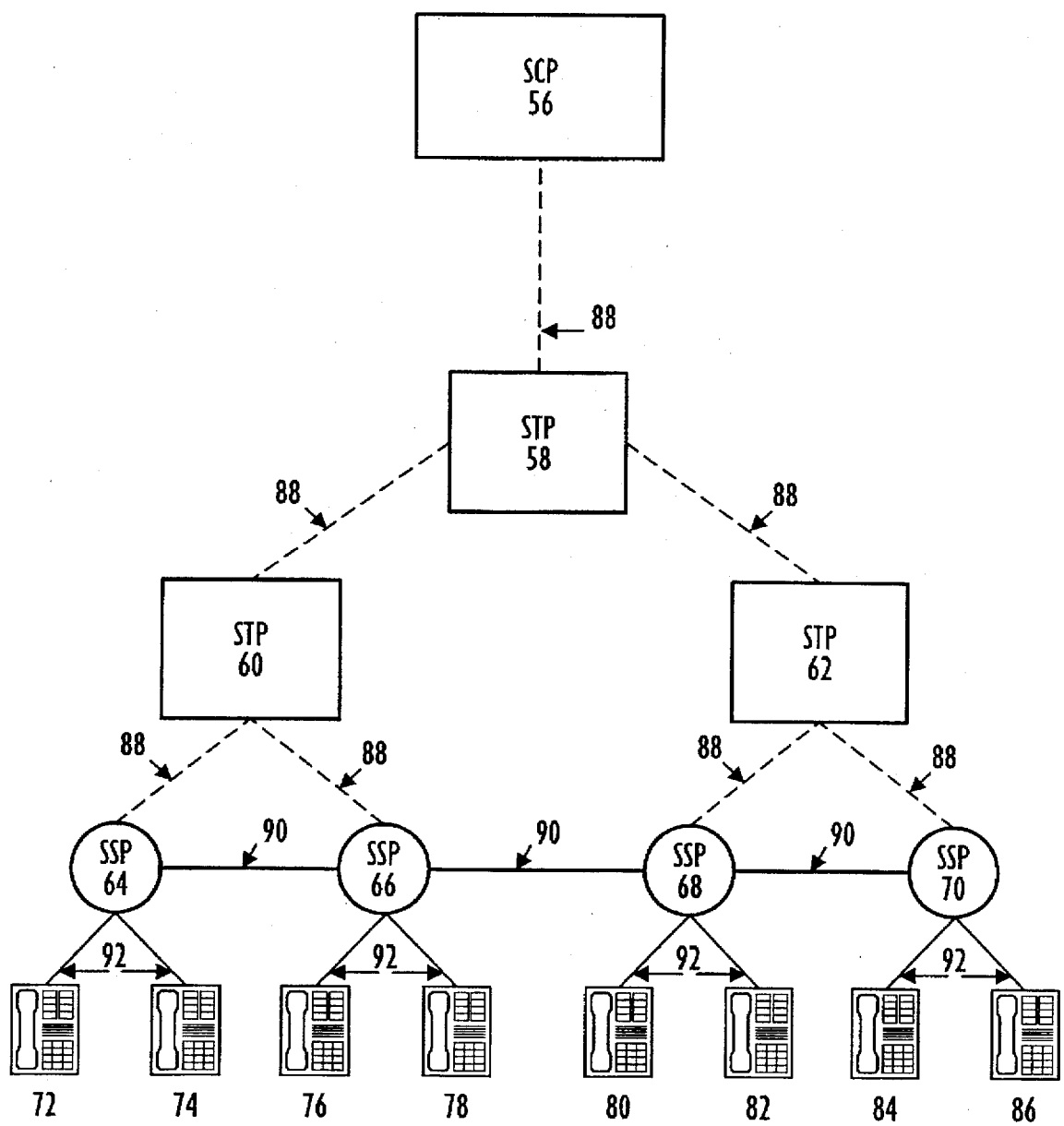
FIG. 5 is a block diagram of the basic components of an Advanced Intelligent Network (AIN) system.

In addition to screening calls attempting to access the network, the intelligent network screening feature of the present invention may be used for calls originating from the private network. That is, the present invention may be used to control or limit access of outgoing calls from the private network, such as long distance phone calls terminating outside of the local service area of the network. Referring now to FIGS. 3A and 3B, a description of network screening for calls originating on the network will be provided.

FIGS. 3A and 3B illustrate an example of the flow diagram of the network screening process, in accordance with the present invention, for a long distance call originating on the public network. As shown in FIG. 3A, a long distance telephone call originates on the public network at step 300, the call will be directed to an SSP of the private network, e.g., from calling station 34A to its associated SSP for the private network SSP 18, at step 301. For example, in FIG. 1, the call will be directed to an SSP of the private network, e.g., SSP 18, associated with the call origination location, e.g., 46B. After the call is directed to an SSP of the private network, step 303, an AIN query is triggered to the ISCP 30. As noted above, a TCAP query message may be sent from the querying SSP 18 through the local and regional STPs to the ISCP 30 via the SS7 links 50.

After the query message has been received by the ISCP 30, the CPR 10 located within the SCP 26 is accessed at step 304. Based on the CPR 10, the ISCP 30 collects the originating number and the terminating number from the query message sent by the querying SSP at step 305. The network screening table is then accessed within the ISCP 30, at step 306, so that the ISCP may determine whether the calling party is authorized to originate long distance calls from the private network.

If the ISCP 30 determines at step 308 that the calling party is not authorized to place the call, then the ISCP 30 may instruct the private network SSP that launched the query to end the call request at step 309. If, however, the ISCP 30 determines that the calling party is authorized to place the call, then call processing may continue to step 310. Based on the screening tables (see FIG. 4), the ISCP 30 may determine at step 310 whether the authorization is conditioned upon entry of a valid code. If no authorization code is required, then call processing proceeds to step 318. However, if an authorization code is needed, the call processing proceeds to step 313.

At step 313, the ISCP 30 may instruct the querying SSP 18 to prompt and collect from the caller an authorization code. The authorization code that is entered by the caller is then sent via the querying SSP to the ISCP 30. At step 314, the ISCP 30 retrieves an authorization table (not shown) stored in SCP 26 and determines whether the code entered by the caller is valid by comparing it with the authorization table. If the entered code is not valid, then the ISCP 30 may instruct the private network querying SSP to end the call request at step 316. However, if the ISCP 30 determines that the authorization code entered by the calling party is valid, then processing proceeds to step 318.

At step 318, the ISCP 30 determines whether the call is an international call. If the call is an international call (e.g., a "011" prefix), then the ISCP 30 at step 319 directs the SSP that launched the query to connect the call to the international IXC associated with the private network SSP that launched the query. If the call is not an international call, then the call is a national call and processing proceeds to step 320.

As shown in FIG. 3B, the ISCP 30 may retrieve the State of the terminating (dialed) number at step 320 from an NPA-NXX-LATA State table (not shown) that may be stored in the database within the SCP 26. The State, determined by the ISCP 30 by searching the NPA-NXX of the terminating number in a look-up table (not shown), is identified to determine whether the call is an interstate call at step 322. If the call is determined to be an interstate call, then the ISCP 30 may direct the connection of the call to the IXC associated with the private network SSP that launched the query at step 323. If the call is not an interstate call (i.e., a call for termination within the State of origination), then the ISCP 30 may access, at step 324, the Directly Connected Trunk Group table (see FIG. 6) from the SCP 26 to determine whether the call may be terminated to a directly connected PBX or CENTREX of the private network SSP that launched the query at step 326. If the call is to terminate to a directly connected PBX or CENTREX of the private network SSP that launched the query, then the ISCP 30 may instruct, at step 327, the SSP that launched the query to connect the call to the terminating number by a direct trunk line, as indicated in the Direct Connection Trunk Group routing table, from directly connected PBXs and CENTREXs. If direct connection is not available, the system may determine whether a 700-RXX number has been dialed at step 331. If a 700-RXX number has not been dialed, the ISCP 30 may retrieve, at step 328, the instate NPA-NXX trunk routing table (see FIG. 7) which may be stored in the database of the SCP 26. Based on the instate NPA-NXX trunk routing table, the ISCP 30 instructs the querying SSP to connect the call to the trunk group indicated in the table at step 330.

If a 700-RXX number has been dialed, the ISCP 30 may retrieve a 700-RXX table at step 332. Each 700-RXX number is assigned a screening code that may enable the ISCP 30, at step 333, to determine which SSP of the private network, and which trunk therefrom, provides direct connection to the dialed 700-RXX termination location.

In accordance with the invention, outgoing calls may be originated by the calling party by dialing 1 digit+10 digits (e.g., a standard long distance phone call) and routed, for example, by a primary interexchange carrier (PIC) code assigned to the private network to a trunk to terminate on the private network switch associated with the calling party's originating number. Since these calls originate on-network, they can go anywhere, i.e., on-network, intrastate off-network, interstate off-network, or international off-network.

A. Authorized to Originate

Referring again to FIG. 3A, a brief description of the logic flow of the present invention for determining when the calling party is authorized to originate a call from the private network will be provided.

When an originating long-distance call, (i.e., 1 digit+10 digits), originating from calling station 46A to its received at the private network SSP (e.g. SSP 18), the call is suspended at step 301 and an AIN trigger is actuated at step 303. The trigger may be based on the billing number of the calling party, which may be the same in the case of individual calling lines. After the CPR 10 and the service logic associated with the network screening service for the call is accessed at step 304, the ISCP 30 may collect the calling (originating) telephone number, the called (terminating) telephone number (from the triggering SSP 18), and the date and time of the call (from an internal ISCP clock) at step 305. Such information may be provided within the query message sent from the triggering SSP to the ISCP 30 after the call has been suspended at step 301.

As shown in FIG. 3A, the ISCP 30 at step 308 will control switch interaction with the customer and will screen the call to determine if the originating number is authorized to make the call. Based on the network screening tables accessed at step 306, the ISCP 30 will determine whether the originating number is an authorized call originating user of the network. The screening tables accessed by the ISCP 30 may be the same tables as described above with reference to FIG. 4. However, in addition to the information contained in the table heretofore described for termination authorization, the tables may include data regarding, e.g., authorization to originate calls without entering an authorization code; authorization to originate calls with a valid authorization code; authorization to originate calls from an outdial on a PBX; or authorization to originate calls with a valid authorization code from an outdial on a PBX, etc.

If the originating number is designated as authorized to originate without an authorization code, the ISCP 30 may instruct the querying SSP 18 to route the call to the appropriate terminating switch in accordance with steps 318–330. If the originating number is designated as authorized to originate with a valid authorization code, then the ISCP 30 may instruct querying SSP 18 to query the calling party for an authorization code at step 313. The authorization code may be entered by the calling party by keying in DTMF digits from a touch-tone phone pad, e.g., 11111. The digits input by the calling party are collected by querying SSP 18 and transmitted to the ISCP 30. At step 315, the ISCP 30 then confirms that the authorization code input by the calling party is valid by searching an authorized code table (not shown) stored in the SCP 26. If the code is not valid, the ISCP 30 may instruct the SSP 18, at step 316, to end the call. Alternatively, the ISCP 30 may instruct SSP 18 to further prompt the caller to input the authorization code again and thereafter check the validity of the newly entered code. The calling party may be given a predetermined number of attempts (e.g., three attempts) to enter a valid code, after which the ISCP 30 will instruct SSP 18 to end the call. Alternatively, the querying SSP, or an IP, may play a failure announcement to the calling party (e.g., "You have failed to enter a valid authorization code."). The calling party may also be instructed, if unable to access the private network, to contact a service provisioning personnel in order to correct a system error (if present), or to update the screening table (if appropriate). If the entered code is determined to be valid at step 315, then the ISCP 30 may further process the call in accordance with steps 318–330 (see FIGS. 3A and 3B).

B. Routing of the Call

Referring now to FIGS. 3A and 3B, routing of an originating call based on an exemplary screening table of the present invention will now be discussed.

If the ISCP 30 finds the originating number authorized to make the outgoing call at step 315, then the ISCP must determine where to route the call and how to direct it to the desired termination number. The number dialed by the calling party, i.e., the number offered for termination by the originating party and transmitted by the SSP query to the ISCP at step 305, is analyzed by the ISCP at step 318 to determine the nature of the terminating number, i.e., whether the call is international or national. If the call is an international call (e.g., a "011" prefix), the international interexchange carrier (IXC) for the private network SSP will be sent that traffic by designation of its trunk group in the TCAP response message from the ISCP 30 to the triggering SSP at step 319.

There may be only one IXC per private network switch for World Zone 1 traffic without any alternate routes. There may also be only one IXC per private network switch for international traffic without any alternate routes. However, the IXC for World Zone 1 traffic and international traffic for a given switch may be different. International traffic, for destinations outside of World Zone 1 traffic, may be dialed with the prefix 011. Calls to Canada and to the Carribean (within the 809 area code) may not be treated as international calls.

If the call is a national call, a look-up table resident in the ISCP, e.g., an NPA-NXX-LATA-State table (not shown), may be used to determine at step 322 if the originating call is interstate or intrastate. The ISCP 30 may use the NPA-NXX of the dialed number as the key into the table to determine in which State the dialed number resides. If the state of termination is the same as the state of origination, the call is intrastate and will be given intrastate treatment by the private network at step 324–330. Similarly, if the call is to a specialized 700-RXX number directly connected to the private network, i.e., through a CENTREX or PBX trunk, the call will be treated as an intrastate call. However, if the call is interstate, the dialed number will terminate outside of the state of origination, and the IXC for the private network switch (i.e., the querying SSP) will be sent that traffic by designation of its trunk group in the TCAP response message from the ISCP 30 to the querying SSP at step 323.

Once the call is determined to be an intrastate call, the ISCP 30 may return to the querying SSP an office route number, or route index, that indicates a trunk group associated with the private network switch, based upon the NPA-NXX of the terminating telephone number. The same trunk routing table that was used above by the ISCP 30, e.g., the instate NPA-NXX Trunk Routing table (see FIG. 7), can be used to route the call at step 330 to an office route number, or route index, for the NPA-NXX for that switch. However, if the trunk routing table does not have an office route number, or route index, for the NPA-NXX associated with the SSP switch, the trunk routing table may provide an office route number to be selected based solely upon the NPA for that switch. The office route number, or route index, may indicate a trunk group going to another SSP switch serving the private network, to Feature Group B trunks to a LATA tandem, or to a Leaky PBX that might tandem the call for local completion.

If the call is determined by the ISCP 30 (based upon the screening code) to terminate to a direct PBX or CENTREX connection to the SSP handling the call, the ISCP 30 may dispense with searching the NPA-NXX tables and connect the call for termination according to the Directly Connected Trunk Group table as discussed above with reference to see FIG. 6.

Similarly, if a dialed 700-RXX number, e.g., "700-type" service, is directly connected to the private network SSP (e.g., 12, 14, or 18) that launched the query, the direct connection may be made with termination only screening codes described above with reference to FIG. 8.

The CENTREXs and PBXs trunks may be directly terminated on the SSP of the private network either with two-way, or one-way, trunks. These terminations each have office route numbers, or route indices, stored in a Directly Connected Trunk Group table, (one such table may be associated with each SSP of the private network), within the ISCP (see FIG. 6).

If the querying SSP of the private network is a LATA tandem with trunks that go out of the "LATA Tandem" side of the switch on physical facilities and wrap back to the "private network" side of the switch, the service logic and the associated service tables at the ISCP 30 should work as if each side of the switch was a physically separate entity.

When the control of an incoming call is returned from the ISCP 30 to the private network SSP that launched the query, i.e., the querying SSP 18, if the trunk group number points to a facility that is already fully utilized, software of the switch underlying the SSP functionality may be used to overflow the call to alternate routes. For example, ISCP 30 may instruct querying SSP 18 to send the call over trunks directly connected to a PBX, but the switch may overflow the call to a leaky PBX or to Feature Group B trunks going to a LATA tandem if the tie lines are currently being fully utilized.

For on-network calls, intra-LATA Toll calls may be permitted by dialing a predetermined prefix, for example, 10189, before the 1+10 digit phone number. Intra-LATA Toll calls may also be permitted by direct connection calls. Both virtual on-network stations and direct connects may use the same completing routes that should exist for Feature Group D trunks from LATA tandems.

If the outgoing call arrives at the private network switch from a direct PBX or CENTREX connection, the ISCP 30 will not be triggered. Calls arriving in this fashion may be prescreened for completion to the dialed number and may use existing phone number translations on the switches to complete.

C. Report Generation

In accordance with another aspect of the present invention, the ISCP 30 may collect and generate reports on call activity associated with a private network. In the ISCP 30, call sampling may be performed by the DRS 28 to record the data the private network subscriber needs for allocating costs, etc. Such call activity data may include: the called party number, the authorization code entered by the calling party (if needed), the date and time (in, for example, "min:sec" format) for every call, and other billing information for the subscriber. The DRS 28 may format this data as needed to create Station Message Detail Recording (SMDR) records. The SMDR records may be transferred electronically to a billing access system of the telephone service provider to the subscriber.

It is noted that the foregoing examples have been provided merely for the purpose of explanation and are in no way to be construed as limiting examples of the present invention. While the invention has been described with reference to preferred embodiments, it is understood that the words which have been used herein are words of description and illustration, rather than words of limitation. Changes may be made within the purview of the appended claims, as presently stated and as amended, without departing from the scope and spirit of the invention and its aspects.

Although the invention has been described herein with reference to particular means, materials and embodiments, the invention is not intended to be limited to the particulars disclosed herein; rather, the invention extends to all functionally equivalent structures, methods, and uses such as are within the scope of the appending claims.

What is claimed:

1. A method for screening calls associated with a private network in an advanced intelligent communications system, the advanced intelligent communications system comprising a two-way communications network interconnecting a plurality of service switching points and a plurality of geographically dispersed network locations, said service switching points selectively establishing a communication connection between at least two of said plurality of network locations in response to a call request from a calling party, one of said plurality of service switching points comprising a designated service switching point designated for receiving incoming traffic for said private network, and a service control point comprising a call processing record including service logic for screening calls associated with said private network, said method comprising:

receiving, at said designated service switching point, a call request from an off-network calling party to establish a communication connection terminating on said private network;

forwarding call data to said service control point, said call data comprising an originating number of said off-network calling party, an authorization code, and a terminating number within said private network;

collecting, at said service control point, said call data and accessing said call processing record associated with said private network;

confirming, at said service control point, whether said off-network calling party is authorized to access said private network based on said authorization code;

thereafter, if said off-network calling party is authorized to access said private network, verifying at said service control point, whether said terminating number within said private network is authorized to receive said call request from said off-network calling party; and routing said call request to said terminating number, within said private network, if said terminating number is authorized to receive said call request from said off-network calling party.

2. The method for screening calls according to claim 1, further comprising denying said call request if said off-network calling party is not authorized to access said private network.

3. The method for screening calls according to claim 1, further comprising denying said call request if said terminating number within said private network is not authorized to receive said call request from said off-network calling party.

4. The method for screening calls according to claim 1, wherein said step of confirming comprises:

accessing a network authorization code table at said service control point, said network authorization code table comprising a plurality of valid authorized codes;

determining whether there is a correspondence between said authorization code and any one of said plurality of valid authorized codes in said network authorization code table; and validating said authorization code, such that said off-network calling party is authorized to access said private network when there is a correspondence between said authorization code and one of said plurality of valid authorized codes, and said off-network calling party is not authorized to access said private network when there is a not correspondence between said authorization code and any of said plurality of valid authorized codes.

5. The method for screening calls according to claim 1, wherein said step of verifying comprises:

accessing, at said service control point, a network screening table associated with said terminating number, said network screening table comprising authorization data for indicating whether said terminating number is authorized to receive said call request; and determining whether said terminating number is authorized to receive said call request based on said authorization data in said network screening table.

6. The method for screening calls according to claim 5, wherein said authorization data comprises one of data indicating that the terminating number is authorized to receive calls, and data indicating that the terminating number is not authorized to receive calls.

7. The method for screening calls according to claim 1, said step of collecting said call data comprising:

collecting said originating number at said service control point in response to said call request;

prompting said off-network calling party, located at one of said network locations, to input said authorization code;

collecting, at said service control point, said authorization code inputted by said calling party;

prompting said off-network calling party to input said terminating number; and collecting, at said service control point, said terminating number inputted by said off-network calling party.

8. The method for screening calls according to claim 1, said step of routing comprises:

accessing a network screening table at said service control point;

determining whether said call request can be routed to said terminating number by a direct trunk from said designated service switching point to said private network;

connecting said call request to said terminating number by said direct trunk when it is determined that said call request can be routed by said direct trunk from said designated service switching point to said private network;

accessing a network trunk group table at said service control point when it is determined that said call request cannot be routed by said direct trunk from said designated service switching point to said private network, said network trunk group table identifying a trunk group associated with said terminating number; and thereafter, connecting said call request to said trunk group associated with said terminating number in order to route said call request to said terminating number.

9. The method for screening calls according to claim 8, wherein said network trunk group table comprises an instate NPA-NXX routing table, said instate NPA-NXX routing table indicating said trunk group based on a NPA-NXX of said terminating number.

10. The method for screening calls according to claim 8, wherein said direct trunk comprises one of a CENTREX group or PBX tie line.

11. The method for screening calls according to claim 1, further comprising the steps of:

receiving, at one of said service switching points, a call request from an on-network calling party to establish a communication connection originating from said private network;

forwarding call data to said service control point, said call data comprising an originating number of said on-network calling party and a terminating number;

collecting, at said service control point, said call data and accessing a network screening table associated with said private network, said network screening table including authorization data identifying an authorization status of said on-network calling party to originate said call request from said private network;

verifying, at said service control point, whether said on-network calling party is authorized to originate said call request from said private network based on said authorization data of said network screening table; and thereafter, if said on-network calling party is authorized to originate said call request from said private network, routing said call request to said terminating number.

12. The method for screening calls according to claim 11, wherein said authorization data comprises one of an authorization to originate calls without entering an authorization code and an authorization to originate calls with a valid authorization code.

13. The method for screening calls according to claim 12, wherein said verifying further comprises determining, based on said authorization data, whether an authorization code is required for authorization of said call request by said on-network calling party, and prompting said on-network calling party for an authorization code when said authorization code is required.

14. The method for screening calls according to claim 13, further comprising collecting an authorization code inputted by said on-network calling party, accessing an authorization code table, at said service control point, said authorization code table comprising a plurality of valid authorization codes, and determining whether said authorization code inputted by said on-network calling party matches any one of said valid authorization codes in said authorization code table, said verifying step verifying that said on-network calling party is authorized to originate said call request from said private network when it is determined that there is a match between said authorization code inputted by said on-network calling party and one of said valid authorization codes in said authorization code table.

15. The method for screening calls according to claim 14, further comprising denying said call request when it is determined that there is not a correspondence between said authorization code inputted by said on-network calling party and any of said valid authorization codes in said authorization code table.

16. The method for screening calls according to claim 11, further comprising denying said call request if said on-network calling party is not authorized to originate said call request from said private network.

17. A system for screening calls associated with a private network in an advanced intelligent communications system, the advanced intelligent communications system comprising a two-way communications network interconnecting a plurality of service switching points and a plurality of geographically dispersed network locations, said service switching points selectively establishing a communication connection between at least two of said plurality of network locations in response to a call request from a third party, one of said plurality of service switching points comprising a designated service switching point designated for receiving incoming traffic for said private network, and a service control point comprising a call processing record including service logic for screening calls associated with said private network, said system comprising:

means for receiving, at said designated service switching point, a call request from an off-network calling party to establish a communication connection terminating on said private network;

means for forwarding call data to said service control point, said call data comprising an originating number of said off-network calling party, an authorization code, and a terminating number within said private network;

means for collecting, at said service control point, said call data and accessing said call processing record associated with said private network;

means for confirming, at said service control point, whether said off-network calling party is authorized to access said private network based on said authorization code;

means for verifying, at said service control point, whether said terminating number within said private network is authorized to receive said call request from said off-network calling party; and means for routing said call request to said terminating number, within said private network, if said off-network calling party is authorized to access said private network and said terminating number is authorized to receive said call request from said off-network calling party.

18. The system for screening calls according to claim 17, further comprising means for denying said call request if said off-network calling party is not authorized to access said private network.

19. The system for screening calls according to claim 17, further comprising means for denying said call request if said terminating number within said private network is not authorized to receive said call request from said off-network calling party.

20. The system for screening calls according to claim 17, wherein said confirming means comprises:

means for accessing a network authorization code table at said service control point, said network authorization code table comprising a plurality of valid authorization codes;

means for determining whether there is a correspondence between said authorization code and any one of said plurality of valid network authorization codes in said authorization code table; and means for validating said authorization code, such that said off-network calling party's authorization to access said private network is validated when there is a correspondence between said authorization code and one of said plurality of valid authorization codes, and said off-network calling party's authorization to access said private network is not validated when there is a not correspondence between said authorization code and any of said plurality of valid authorization codes.

21. The system for screening calls according to claim 17, wherein said verifying means comprises:

means for accessing a network screening table associated with said terminating number, said network screening table comprising authorization data for indicating whether said terminating number is authorized to receive said call request; and means for determining whether said terminating number is authorized to receive said call request based on said authorization data in said network screening table.

22. The system for screening calls according to claim 21, wherein said authorization data comprises one of data indicating that the terminating number is authorized to receive calls, and data indicating that the terminating number is not authorized to receive calls.

23. The system for screening calls according to claim 17, said collecting means for collecting said call data comprises:

means for collecting said originating number at said service control point in response to said call request;

means for prompting said off-network calling party, located at one of said network locations, to input said authorization code;

means for collecting, at said service control point, said authorization code inputted by said off-network calling party;

means for prompting off-network calling party to input said terminating number; and means for collecting, at said service control point, said terminating number inputted by said off-network calling party.

24. The system for screening calls according to claim 17, said routing means comprises:

means for accessing a network screening table at said service control point;

means for determining, based on said network screening table, whether said call request can be routed to said terminating number by a direct trunk from said designated service switching point to said private network;

means for connecting said call request to said terminating number by said direct trunk when it is determined that said call request can be routed by said direct trunk from said designated service switching point to said private network;

means for accessing a network trunk group table at said service control point when it is determined that said call request cannot be routed by said direct trunk from said designated service switching point to said private network, said network trunk group table identifying a trunk group associated with said terminating number; and means for connecting said call request to said trunk group associated with said terminating number in order to route said call request to said terminating number.

25. The system for screening calls according to claim 24, wherein said network trunk group table comprises an instate NPA-NXX routing table, said instate NPA-NXX routing table indicating said trunk group based on a NPA-NXX of said terminating number.

26. The system for screening calls according to claim 24, wherein said direct trunk comprises one of a CENTREX group or PBX tie line.

27. The system for screening calls according to claim 17, further comprising:

means for receiving, at one of said service switching points, a call request from an on-network calling party to establish a communication connection originating from said private network;

means for forwarding call data to said service control point, said call data comprising an originating number of said on-network calling party and a terminating number;

means for collecting, at said service control point, said call data and accessing a network screening table associated with said private network, said network screening table including authorization data identifying an authorization status of said on-network calling party to originate said call request from said private network;

means for verifying, at said service control point, whether said on-network calling party is authorized to originate said call request from said private network based on said authorization data of said network screening table; and means for routing said call request to said terminating number when said verifying means verifies that said on-network calling party is authorized to originate said call request from said private network.

28. The system for screening calls according to claim 27, wherein said authorization data comprises one of an authorization to originate calls without entering an authorization code and an authorization to originate calls with a valid authorization code.

29. The system for screening calls according to claim 28, wherein said verifying means further comprises means for determining, based on said authorization data, whether an authorization code is required for authorization of said call request by said on-network calling party, and means for prompting said on-network calling party for an authorization code when said authorization code is required.

30. The system for screening calls according to claim 29, further comprising means for collecting an authorization code inputted by said on-network calling party, means for accessing an authorization code table, at said service control point, said authorization code table comprising a plurality of valid authorization codes, and means for determining whether said authorization code inputted by said on-network calling party matches any one of said valid authorization codes in said authorization code table, said verifying means verifying that said on-network calling party is authorized to originate said call request from said private network when it is determined that there is a correspondence between said authorization code inputted by said on-network calling party and one of said valid authorization codes in said authorization code table.

31. The system for screening calls according to claim 27, further comprising means for denying said call request when it is determined that there is not a correspondence between said authorization code inputted by said on-network calling party and any of said valid authorization codes in said authorization code table.

32. The system for screening calls according to claim 27, further comprising means for denying said call request if said on-network calling party is not authorized to originate said call request from said private network.

* * * * *